US006889266B1

(12) United States Patent
Stadler

(10) Patent No.: US 6,889,266 B1
(45) Date of Patent: May 3, 2005

(54) METHOD FOR DELIVERING PACKET BOUNDARY OR OTHER METADATA TO AND FROM A DEVICE USING DIRECT MEMORY CONTROLLER

(75) Inventor: Laurent Stadler, San Francisco, CA (US)

(73) Assignee: Xilinx, Inc., San Jose, CA (US)

(*) Notice: Subject to any disclaimer, the term of this patent is extended or adjusted under 35 U.S.C. 154(b) by 318 days.

(21) Appl. No.: 09/947,302

(22) Filed: Sep. 5, 2001

(51) Int. Cl.⁷ .............................................. G06F 13/14
(52) U.S. Cl. ........................ 710/22; 707/10; 707/202
(58) Field of Search ............................. 710/22; 707/10, 707/202

(56) References Cited

U.S. PATENT DOCUMENTS

| | | |
|---|---|---|
| 6,272,451 B1 | 8/2001 | Mason et al. |
| 6,459,646 B1 | 10/2002 | Yee et al. |
| 6,467,009 B1 | 10/2002 | Winegarden et al. |
| 6,490,585 B1 * | 12/2002 | Hanson et al. ................ 707/10 |
| 6,531,889 B1 | 3/2003 | Leitch |
| 6,704,850 B1 | 3/2004 | Reynolds |

OTHER PUBLICATIONS

NET=ARM, Hardware Reference Guide, www.netarm.com, 55595B/0136951, 100 9802, Netsilicon, Inc., Embedded Networking Solutions, Waltham, MA 02452 (7 pages).

* cited by examiner

Primary Examiner—A. Elamin
(74) Attorney, Agent, or Firm—Blakely Sokoloff; John King

(57) ABSTRACT

An existing field of a descriptor is used to store metadata associated with a block of data to be transferred. The metadata is sent to a device using a special command when transferring the block of data from a memory to the device. The metadata is sent to the device using an existing bus. The metadata is sent to the device from the field of the descriptor. The metadata may carry packet boundary information, transmit status information, or receive status information.

30 Claims, 6 Drawing Sheets

| Field | Field Description |      |
|-------|-------------------|------|
| 1     | Source Address    | ~305 |
| 2     | Destination Address | ~310 |
| 3     | Transfer Count    | ~315 |
| 4     | Ownership         | ~320 |

FIG. 3A

| Field | Field Description |      |
|-------|-------------------|------|
| 1     | Source Address    | ~305 |
| 2     | Transmit Descriptor Status | ~325 |
| 3     | Transfer Count    | ~315 |
| 4     | Ownership         |      |

FIG. 3B

| Field | Field Description |      |
|-------|-------------------|------|
| 1     | Receive Descriptor Status | ~330 |
| 2     | Destination Address | ~310 |
| 3     | Transfer Count    | ~315 |
| 4     | Ownership         |      |

FIG. 3C

| ACKSEL | DMACTL | COMMAND |
|---|---|---|
| 0 | 0 | No Acknowledge |
| 1 | 0 | Acknowledge ~405 |
| 0 | 1 | Retransmit_Acknowledge ~410 |
| 1 | 1 | Last_Acknowledge ~415 |

FIG. 4A

| ACKSEL | DMACTL | COMMAND |
|---|---|---|
| 0 | 0 | No Acknowledge |
| 1 | 0 | Acknowledge |
| 0 | 1 | Special Acknowledge ~420 |
| 1 | 1 | Last_Acknowledge |

FIG. 4B

METHOD FOR DELIVERING PACKET BOUNDARY OR OTHER METADATA TO AND FROM A DEVICE USING DIRECT MEMORY CONTROLLER

FIELD OF THE INVENTION

The present invention relates generally to the field of logic design. More specifically, the present invention relates to a method and an apparatus for delivering metadata using a direct memory controller (DMA).

BACKGROUND

A Configurable System-on-Chip (CSoC) is a single-chip combination of an industry-standard microprocessor, embedded programmable logic, memory and a dedicated system bus. In addition to the processor, the CSoC may incorporate many dedicated system features including a cache memory, an external memory interface unit, and a direct memory access (DMA) controller. These features are integrated with a dedicated configurable system interconnect (CSI) bus and embedded field programmable logic array (FPGA). This FPGA is also referred to as configurable system logic or CSL.

FIG. 1 is a block diagram illustrating an example of a prior art configurable system-on-chip (CSoC). The CSoC includes a CSL 110, a DMA controller 125, a central processing unit (CPU) 105, a memory 130 and a CSI bus 100. The DMA controller 125 may have multiple DMA channels (e.g., four). Each of the DMA channels can be programmed independently and any one of the channels may be active at any moment. Programming the DMA channels may involve writing into appropriate DMA registers.

The CPU 105 or the DMA controller 125 can master the CSI bus 100 while the CSL 110 cannot. When a signal is asserted for a particular DMA channel, the DMA controller 125 asks an arbiter 140 to grant it the CSI bus 100 so that the DMA controller 125 can use the CSI bus 100. The DMA controller 125 may request for control of the CSI bus 100 by asserting request signal which goes to the arbiter 140. Typically, the CSI bus 100 is a 32-bit address bus that is used to selectively access various components of the internal circuitry (e.g., registers in the CSL, DMA controllers, Ethernet controller, etc.) or external devices (e.g., memory devices, etc.).

Generally, there are bus signals driven to the CSL 110 containing addresses and write data, and there are bus signals coming from the CSL 110 containing read data. Although the CSL 110 is capable of providing data, it is not capable of specifying addresses, direction of data, or transaction size. The CSL 110 can send or receive data through transactions with the DMA controller 125. The DMA controller 125 acts as the bus master of the CSI bus 100. Similarly, the DMA controller 125 may participate in the data transfer between the memory 130 and other devices 135, and between areas of the memory 130.

The CSL 110 may include multiple soft modules or CSL devices 115, 117. The CSL 110 also includes CSL bus signal lines for outgoing and incoming signals. For example, the CSL 110 may include two outgoing point-to-point bus signal lines (not shown) and two incoming point-to-point bus signal lines (not shown). These bus signal lines carry bus signals between the CSL devices 115, 117, and the DMA controller 125. The DMA controller 125 has registers to store the number of bytes to be transferred and the 32-bit starting address in memory, or a 32-bit destination address, or both source and destination addresses for memory to memory transfers. The DMA controller 125 can transfer the bytes one at a time under control of a DMA request signal, or a single request can initiate the transfer of an entire block of data. Once a transfer is completed, the DMA controller 125 may shut down until it is needed again.

Many network protocols (e.g., Ethernet, USB, etc.) are packet (or frame) based. This requires that a device attempting to implement one of these protocols determine packet boundaries from the transmit data stream and provide packet boundary information for the receive data stream. Other information contained in the transmit data stream and receive data stream may include transmit options, receive status, transfer priority, etc. They are referred to collectively as metadata. The metadata may be placed contiguous with the data. Placing the metadata contiguous with the data is possible in a normal implementation, but causes software problems. So called "zero-copy" protocol stacks are more efficient because the data to be sent or received is placed in memory by the producer (e.g., CSL device) and is left there for subsequent processing. However, for transmit using a zero-copy stack, it is infeasible to add the metadata contiguous with the normal data since this would require expanding the allocation of a memory block that has already been allocated. This is something that most memory allocation schemes cannot do. Placing control information in the midst of data presents difficulties to software.

SUMMARY OF THE INVENTION

In one embodiment, a method of sending metadata using a direct memory controller (DMA) is disclosed. An existing field of a descriptor is used to store metadata associated with a block of data to be transferred. The metadata is sent to a device using a special command when transferring the block of data from a memory to the device and is received from the device when transferring a block of data form the device to the memory. The metadata is sent to the device using an existing bus. The metadata is sent to the device from the field of the descriptor.

Other features and advantages of the present invention will be apparent from the accompanying drawings and from the detailed description that follows below.

BRIEF DESCRIPTION OF THE DRAWINGS

The present invention is illustrated by way of example, and not limitation, in the figures of the accompanying drawings in which like references indicates similar elements and in which:

FIGS. 3A, 3B, 3C illustrate the different descriptor fields.

FIG. 4A illustrates a set of typical DMA commands

FIG. 4B illustrates a DMA "Special Acknowledge" command.

DETAILED DESCRIPTION

A method and an apparatus for delivering packet boundary or other metadata to or from devices using a DMA controller and a field in a descriptor are disclosed. Metadata is provided using a field in the descriptor. In a memory-to-device transfer, the metadata is transferred by the DMA controller to a target device in a special cycle. In a device-to-memory transfer, the metadata is provided by the device in another special cycle. The metadata is written into the corresponding descriptor by the DMA controller.

In this description, CSI stands for a configurable system interconnect bus. CSL stands for configurable system logic. A "CSL device" is a soft peripheral in the CSL to implement a particular function. A hard peripheral is any hardware devices capable of receiving data from the memory and transferring data to the memory using the DMA controller. A metadata is used to provide information about the data being transferred. This information may include packet boundaries, transmit options, receive status, transfer priority, etc.

Figure 1:
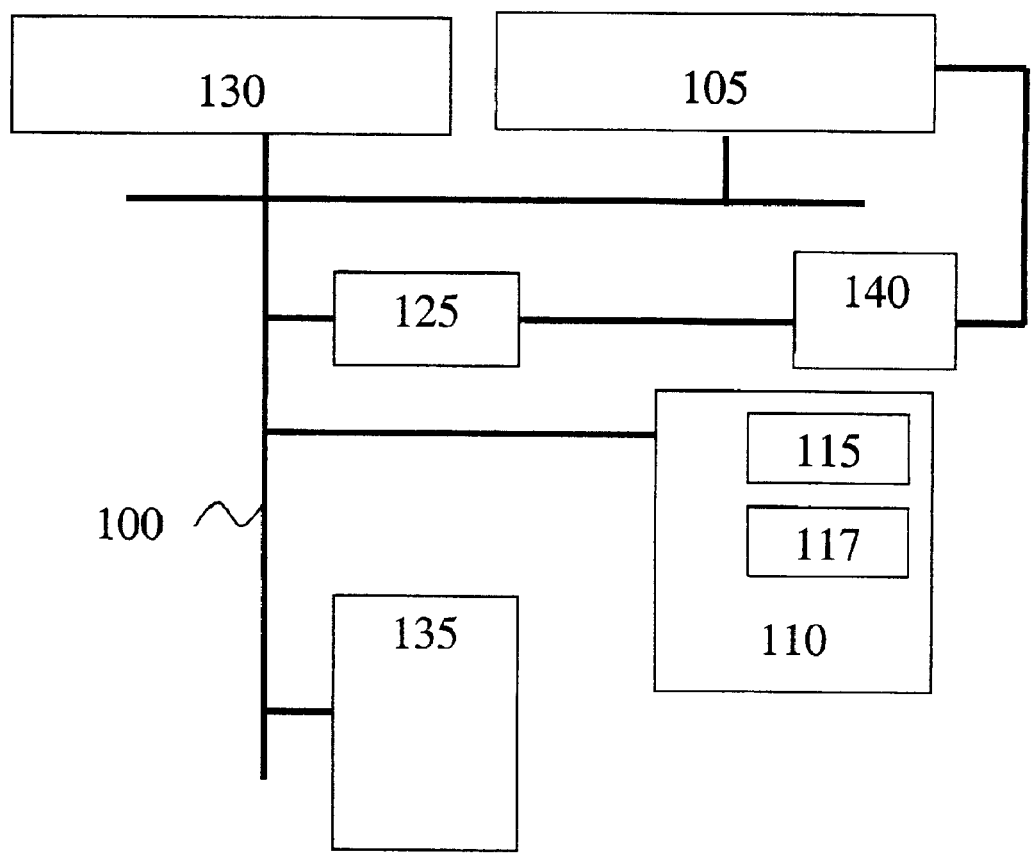
FIG. 1 is a block diagram illustrating an example of a prior art configurable system-on-chip (CSoC).
Figure 2:
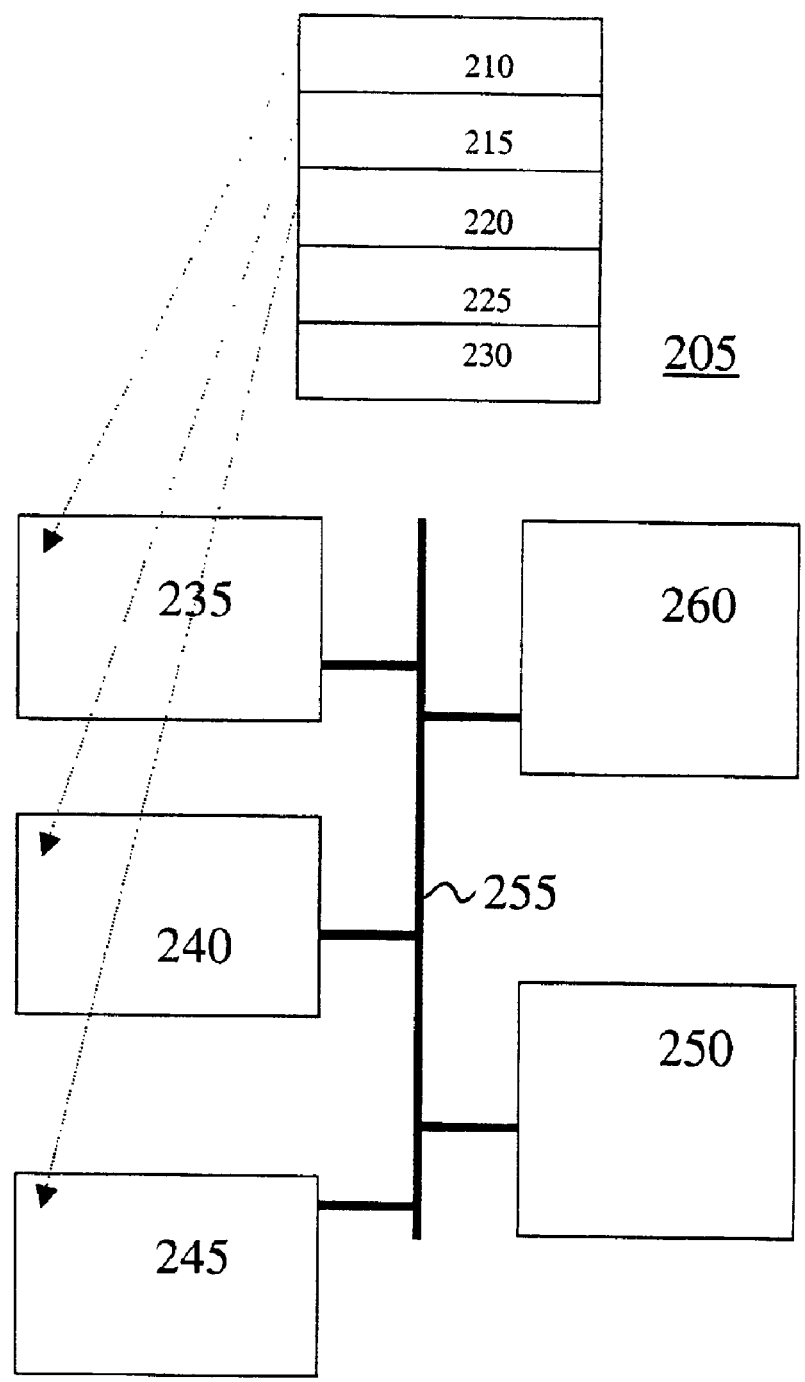
FIG. 2 is a block diagram illustrating a DMA using a descriptor table for data transfer.

FIG. 2 is a block diagram illustrating a DMA controller using a descriptor table for data transfer. FIG. 2 includes a DMA controller 260 connecting with a device 250 and memory blocks 235–245 through a bus 255. Typically, the descriptor table 205 includes one or more descriptors 210–230. Each descriptor provides information for the DMA controller 260 to perform a data transfer. Normally, the DMA controller 260 goes to the descriptor table, determines pointers to the memory blocks 235–245, and transfers a block of data to the bus 255. The type of data transfers performed by the DMA controller 260 may include memory-to-memory, memory-to-device, and device-to-memory. Accordingly, the descriptor table may include descriptors for memory-to-device transfers and descriptors for device-to-memory transfers. There may be separate descriptor tables for each direction, or there may be one descriptor table having interleaving data transfer directions.

FIG. 3A is a table illustrating typical fields of information contained in a descriptor. Typically, when a data transfer is in a memory-to-device direction, the source address field 305 contains a memory address and the destination address field 310 is not used. This is because the device address is already known to the DMA controller. The transfer count 315 determines how much data to be transferred to the device, and the ownership 320 determines whether the CPU or the device is using the descriptor. Similarly, when a data transfer is in a device-to-memory direction, the source address field 305 is not used and the destination address field 310 contains a memory address.

Referring back to FIG. 2, the DMA controller 260 uses the descriptor table 205 to get information about the data transfer to be performed. The DMA controller 260 examines the descriptor to determine the direction of the data transfer. For example, when the descriptor 210 indicates that data is to be transferred from the memory block 235 to the device 250, the source address field 305 and the transfer count field 315 of the descriptor 210 are used to determine the starting address and the size of data block to be transferred to the device 250. Similarly, when the descriptor 215 indicates that data is to be transferred from the device 250 to the memory block 240, the destination address field 305 and the transfer count field 315 of the descriptor 215 are used to determine the starting address and the size of data to be written to the memory block 240.

As described above, metadata (e.g., transmit options, receive status, packet boundary information, etc.) is typically placed contiguous with the data stream. For example, consider the following series of transaction for a memory-to-device data transfer:

DMA Commands: A A A A A L A A A A A L

Data streams: X x x x x x x Y y y y y y where the DMA command "A" is the "Acknowledge" command, and the DMA command "L" is the "Last Acknowledge" command. The data streams include the metadata "X" for the data packets "x" and the metadata "Y" for the data packets "y". Thus, when the DMA controller issues "Last Acknowledge" command, the next piece of data received by the device will carry the metadata information for the next stream of data. In this example, each descriptor includes meaningful information in the source address field, the transfer count field and the ownership field. Following is another example of a series of transaction of device-to-memory data transfer:

DMA Commands: A A A A A L A A A A A L

Data streams: X x x x x x x Y y y y y y where the DMA command "A" is the "Acknowledge" command, and the DMA command "L" is the "Last Acknowledge" command. The data streams include the metadata "X" for the data packets "x" and the metadata "Y" for the data packets "y". Thus, when the "Last Acknowledge" command is issued by the DMA, the next piece of data sent by the device will carry the metadata information for the next stream of data. In this example, each descriptor includes meaningful information in the destination address field, the transfer count field and the ownership field.

In normal DMA operation, there is no capability to send or receive metadata associated with each descriptor. In one embodiment, in a memory-to-device data transfer, the destination address field in the descriptor is changed to be a transmit descriptor status field 325, as illustrated in FIG. 3B. The transmit descriptor status field 325 is used to contain the metadata describing the data specified by the source address field 305 and the transfer count 315.

In another embodiment, in a device-to-memory data transfer, the source address field in the descriptor is changed to be a receive descriptor status field 330, as illustrated in FIG. 3C. The receive descriptor status field 330 is used to contain the metadata describing the data specified by the destination address field 310 and the transfer count 315. Thus, the descriptor table format will be unchanged. In addition, the metadata does not change the size of the descriptor because the metadata occupies an existing field (either source address or destination address) of the descriptor. This technique is advantageous because the descriptor memory need not be contiguous to the data.

FIG. 4A illustrates a set of typical DMA commands. The commands include the "Acknowledge" command 405 and the "Last Acknowledge" command 415 described above. In one embodiment, the DMA controller sends the metadata in the descriptor to the device in the memory-to-device data transfer using a special cycle. This special cycle is entered by the DMA controller issuing a "Special Acknowledge" command 420, as illustrated in FIG. 4B. The "Special Acknowledge" command 420 replaces the "Retransmit Acknowledge" command 410. The DMA controller may need to be configured to recognize that the part of the descriptor carries the metadata. For example, this may be done by writing a special value to a DMA register. Without this special value, operation of the DMA controller remains the same as before (i.e., does not recognize the existence of the metadata in the descriptor). There is no requirement for additional bus connection between the DMA controller and a device.

Figure 5:
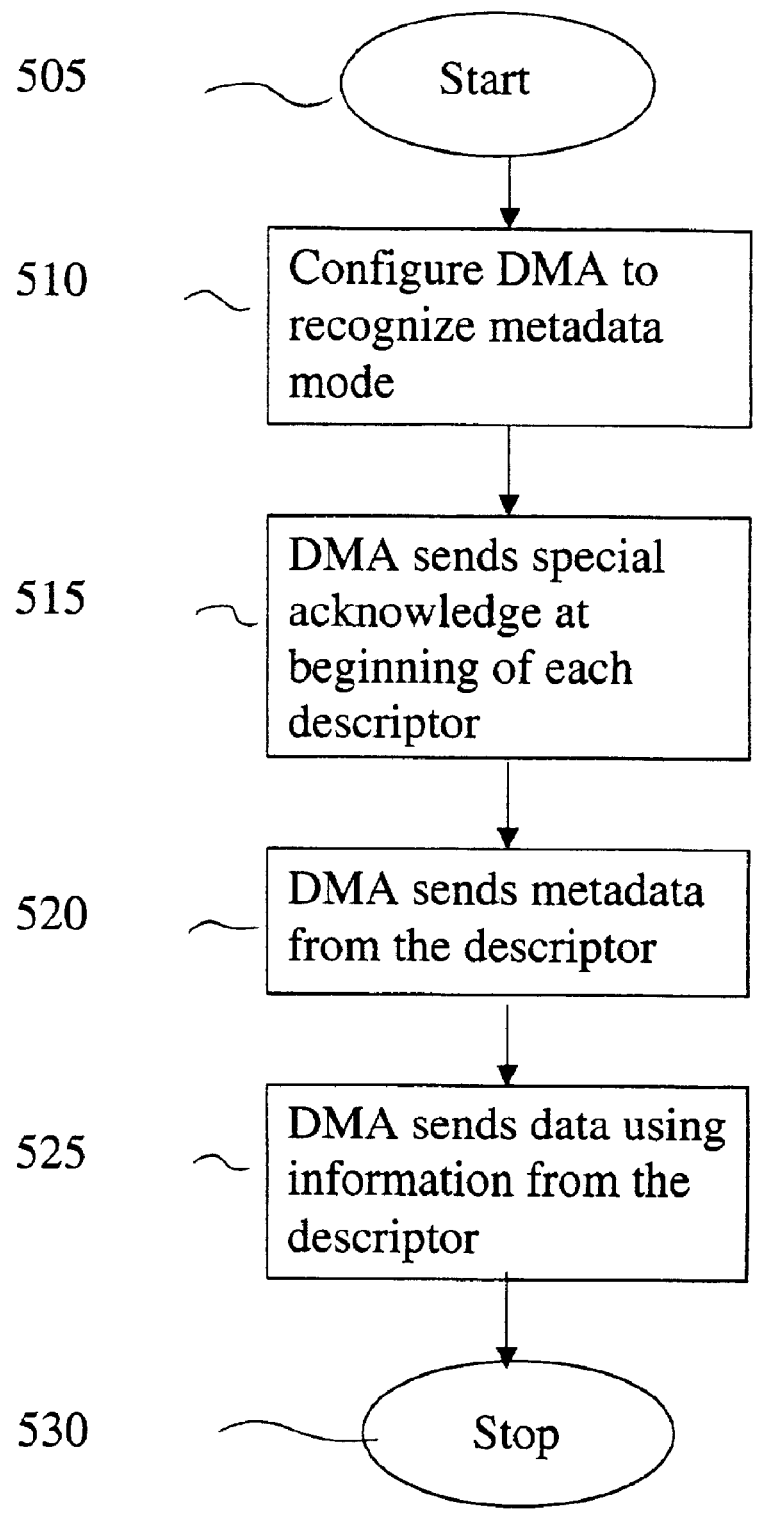
FIG. 5 is a flow diagram illustrating a memory-to-device data transfer process.

FIG. 5 is a flow diagram illustrating a memory-to-device data transfer process. The process starts at block 505. At block 510, the DMA controller is configured to recognize that the descriptor includes a field carrying the metadata. In one embodiment, every time the DMA controller moves on to a new descriptor, the DMA controller will issue a "Special Acknowledge" command to the device, as shown in block 515. This is done before a first piece of data from this descriptor's buffer is transferred. The metadata for the data being transferred is provided in the "Transmit Descriptor Status" field of the descriptor. The "Special Acknowledge" command is issued by the DMA controller independently of whether the DMA controller moves to the new descriptor on its own or as a result of a "Last Acknowledge" command.

At block 520, the metadata from the descriptor is sent by the DMA controller. Note that the operations in block 515 and 520 may occur almost concurrently. For example, after the DMA controller issues the "Special Acknowledge" command, the device can expect to receive the metadata from the bus. When the device receives the metadata, it parses the metadata to get information about the data that it is about to receive. For example, the device may find out information about packet boundaries, etc. and acts on the data accordingly. At block 525, the DMA controller sends the data to the device using the source address and the transfer count information in the descriptor. The process ends at block 530.

Following is an example of a series of memory-to-device transactions using the DMA controller configured to issue "Special Acknowledge" commands:

DMA Commands: $\underline{S}$ A A A A A L $\underline{S}$ A A A A A L

Data Streams: X x x x x x x x x Y y y y y y y where the DMA command "S" is the "special Acknowledge" command, "L" is the "Last Acknowledge" command, and "A" is the "Acknowledge" command. The "Special Acknowledge" commands are underlined for easier recognition. The data streams include the metadata "X" for the "x" data stream and the metadata "Y" for the "y" data stream. Note that the metadata is not stored contiguously with the "x" data stream or the "y" data stream in memory, but rather they are stored separately in the descriptor. Thus, for the "x" data stream, the DMA controller first issues the "Special Acknowledge" command and the metadata "X" is sent. Note that this is done before the first piece of data "x" is sent. The DMA controller issues a "Last Acknowledge" command when the last piece of data "x" is sent. Similarly, for the "y" data stream, the DMA controller first issues the "Special Acknowledge" command and the metadata "Y" is sent. Note again that this is done before the first piece of data "y" is sent. The DMA controller then issues a "Last Acknowledge" command when the last piece of data "y" is sent.

Figure 6:
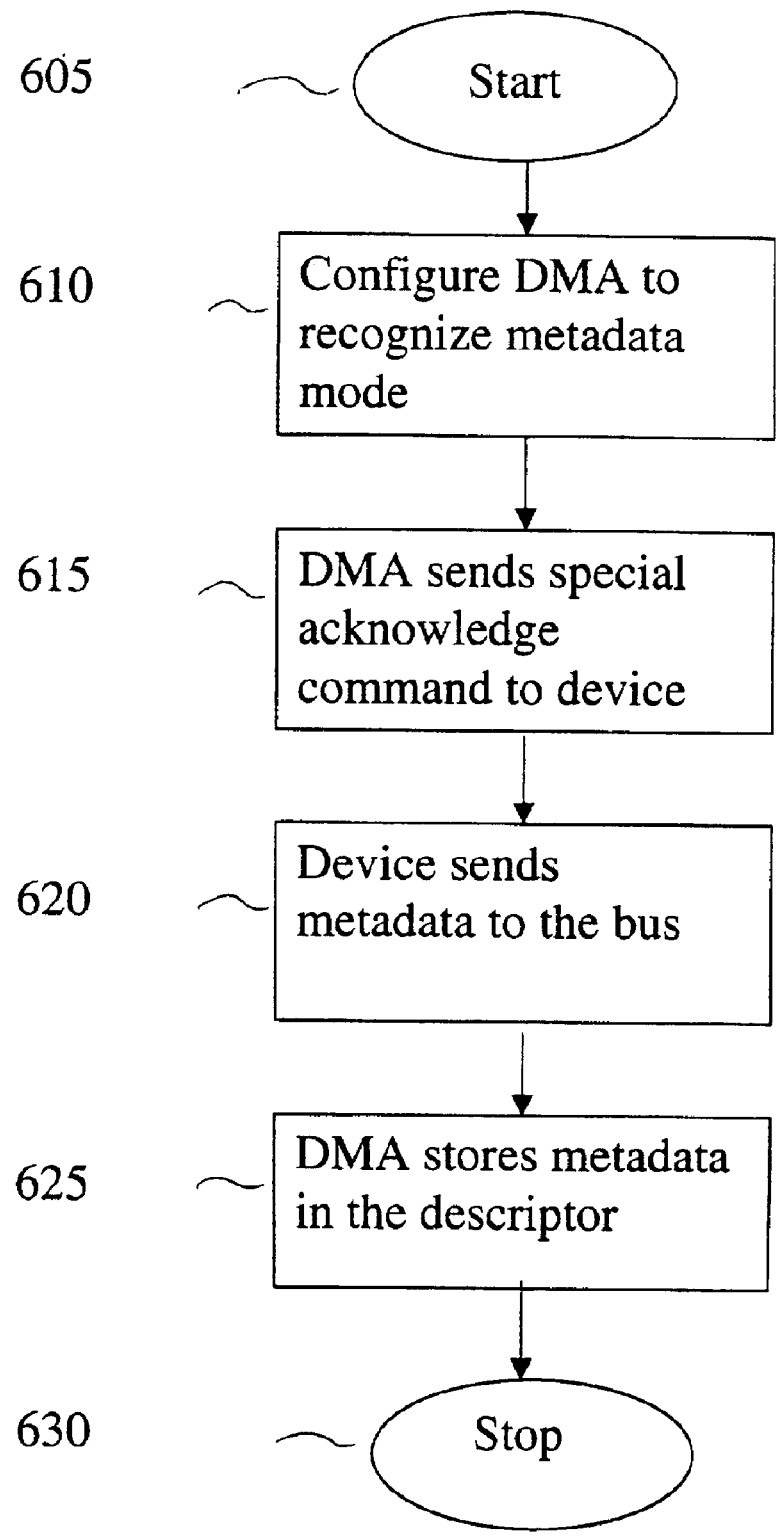
FIG. 6 is a block diagram illustrating a device-to-memory data transfer process.

FIG. 6 is a block diagram illustrating a device-to-memory data transfer process. The process starts at block 605. At block 610, the DMA controller is configured to recognize that the descriptor includes a metadata field. Every time the DMA controller moves to a new descriptor, the DMA controller issues a "Special Acknowledge" command to the device, as shown in block 615. Note that this "Special Acknowledge" command is sent after a last piece of data is transferred to that descriptor's buffer via a "Last Acknowledge" command. The metadata is put onto the bus by the device, as shown in block 620. The metadata is placed in the Receive Descriptor status field of the descriptor by the DMA controller, as shown in block 625. The process ends at block 630.

Following is an example of a series of device-to-memory transactions using the DMA controller configured to issue "Special Acknowledge" commands:

DMA Commands: A A A A A A L $\underline{S}$ A A A A A L $\underline{S}$

DataStreams: x x x x x x x X y y y y y y Y where the DMA command "S" is the "Special Acknowledge" command, "L" is the "Last Acknowledge" command, and "A" is the "Acknowledge" command. The "Special Acknowledge" commands are underlined for easier recognition. The data streams include the metadata "X" for the "x" data stream and the metadata "Y" for the "y" data stream. Note that the metadata is not stored contiguously with the "x" data stream or the "y" data stream in memory, but rather they are stored separately in the descriptor. Thus, for the "x" data stream, the DMA controller issues the "Special Acknowledge" command after the "Last Acknowledge" command. The DMA controller then receives the metadata "X" from the bus and places it in the descriptor. Note that this is after the last piece of data "x" is received. Similarly, for the "y" data stream, the DMA controller issues the "Special Acknowledge" command after the "Last Acknowledge" command. The DMA controller then receives the metadata "Y" sent by the device from the bus.

Using the technique described above, the DMA controller does not have to know about the connecting devices and does not need any special connection to the devices. The technique is useful for dealing with both hard peripherals (e.g., Ethernet chip, USB, etc.) and soft peripherals (e.g., CSL devices). The DMA controller merely uses a field in the descriptor that is defined to carry the metadata. The metadata is sent or received by the DMA controller even though the DMA controller does not understand the metadata. The device and its software understand and know how to make use of the metadata. In addition, using the technique described above, packet boundary or other metadata can be delivered to or from the soft peripherals (e.g., CSL device) or hard peripherals during DMA transaction. For example, the metadata may include packet boundary information so that the CSL device knows what to expect.

Thus, even though the DMA controller does not understand or know how to manipulate the metadata, it needs to be able to transfer the metadata. For example, the DMA controller needs to know that when it moves to a new descriptor and before it starts to transmit data based on that descriptor, it has to send the metadata in the descriptor to the device using a special bus cycle. In order for the DMA controller to do this, it has to be set in a special mode. As described above, this is accomplished by writing a special value to a DMA register.

Although the above description refers to delivering packet boundary information, transfer and receive status, the method and system of the present invention may also be used to pass any 32 bits of data to or from the CSL device and other hard peripherals.

The operations of the various methods of the present invention may be implemented by a processing unit in a digital processing system, which executes sequences of computer program instructions which are stored in a memory which may be considered to be a machine-readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

From the description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of sending metadata using a direct memory controller (DMA), comprising:
   using an existing field of a descriptor to store metadata associated with a block of data to be transferred; and
   sending the metadata to a device using a special command when transferring the block of data from a memory to the device, wherein the metadata is sent to the device using an existing bus, and wherein the metadata is sent from the field of the descriptor.

2. The method of claim 1, further comprising configuring a DMA to recognize that the field of the descriptor contains the metadata, the metadata providing information about the block of data.

3. The method of claim 1, wherein when transferring the block of data from the memory to the device, the metadata is stored in a destination address field of the descriptor.

4. The method of claim 1, wherein sending the metadata to the device using the special command comprises sending the special command to the device when the DMA first moves to the descriptor and before sending a first piece of data from the block of data.

5. The method of claim 1, further comprising receiving the metadata from the device using the special command when transferring the block of data from the device to the memory, wherein the metadata is sent from the device using the existing bus.

6. The method of claim 5, wherein receiving the metadata from the device using the special command comprises sending the special command to the device after receiving a last piece of data from the block of data.

7. The method of claim 6, wherein the metadata received from the device is stored in the field of the descriptor.

8. The method of claim 6, wherein the field of the descriptor is the source address field.

9. The method of claim 1, wherein the metadata includes packet boundary information.

10. The method of claim 1, wherein the metadata includes transmit or receive status information.

11. A computer readable medium having stored thereon sequences of instructions which are executable by a system, and which, when executed by the system, cause the system to:
   use an existing field of a descriptor to store metadata associated with a block of data to be transferred; and
   send the metadata to a device using a special command when transferring the block of data from a memory to the device, wherein the metadata is sent to the device using an existing bus, and wherein the metadata is sent from the field of the descriptor.

12. The computer readable medium of claim 11, further comprising instructions to configure a DMA to recognize that the field of the descriptor contains the metadata, the metadata providing information about the block of data.

13. The computer readable medium of claim 11, wherein when transferring the block of data from the memory to the device, the metadata is stored in a destination address field of the descriptor.

14. The computer readable medium of claim 11, wherein the instructions to send the metadata to the device using the special command comprises instructions to send the special command to the device when the DMA first moves to the descriptor and before sending a first piece of data from the block of data from the memory.

15. The computer readable medium of claim 11, further comprising instructions to receive the metadata from the device using the special command when transferring the block of data from the device to the memory, wherein the metadata is sent from the device using the existing bus.

16. The computer readable medium of claim 15, wherein the instructions to receive the metadata from the device using the special command comprises instructions to send the special command to the device after receiving a last piece of data from the block of data from the device.

17. The computer readable medium of claim 16, wherein the metadata received from the device is stored in the field of the descriptor.

18. The computer readable medium of claim 16, wherein the field of the descriptor is the source address field.

19. The computer readable medium of claim 11, wherein the metadata includes packet boundary information.

20. The computer readable medium of claim 10, wherein the metadata includes transmit or receive status information.

21. A system, comprising:
   a bus;
   a memory connected to the bus;
   a device connected to the bus;
   a direct memory controller (DMA) connected to the bus and configured to transfer a block of data between the device and the memory using the bus, the DMA configured to issue a special acknowledge command to the device to send or to receive metadata, the metadata providing information about the block of data to be transferred, wherein the metadata is stored in an existing field of a descriptor associated with the block of data.

22. The system of claim 21, wherein the metadata is sent or received using the bus.

23. The system of claim 22, wherein the metadata is not stored in the memory.

24. The system of claim 21, wherein when the DMA transfers the block of data from the memory to the device, the DMA issues the special acknowledge command to send the metadata to the device before any data from the block of data is sent to the device.

25. The system of claim 24, wherein the existing field of the descriptor where the metadata is stored is a destination address field.

26. The system of claim 21, wherein when the DMA transfers the block of data from the device to the memory, the DMA issues the special acknowledge command to receive the metadata from the device after a last piece of data from the block of data is sent by the device.

27. The system of claim 26, wherein the existing field of the descriptor where the metadata is stored is a source address field.

28. The system of claim 21, wherein the metadata includes packet boundary information.

29. The system of claim 21, wherein the metadata includes transmit or receives status information.

30. The system of claim 21, wherein the device is one in a group consisting of a soft device and a hard device.

* * * * *